Patented Mar. 20, 1934

1,951,378

UNITED STATES PATENT OFFICE 1,951,378

METHOD OF PRODUCING ARTICLES FROM PLASTICS

Douglas Frank Twiss and Edward Arthur Murphy, Wylde Green, England, assignors to Dunlop Rubber Company Limited, London, England, a corporation of Great Britain No Drawing. Application July 29, 1932, Serial No. 626,215. In Great Britain August 7, 1931

10 Claims. (Cl. 18—58)

This invention is concerned with a method for the production of articles of or containing organic materials of the kinds hereinafter specified provided with a surface finish ranging from a smooth matt to a coarse granular texture as desired.

One of the objects of the present invention is to produce articles of or containing organic materials of the kinds hereinafter specified having a standard degree of surface finish which can range from a smooth matt to a coarse granular texture, as desired direct from aqueous emulsions or dispersions or solutions of the kinds hereinafter specified without it being necessary to have to prepare any of the special granular precipitates hereinafter mentioned when the standard degree of surface finish is subsequently required to be given to articles being formed.

Another object is to provide a method for the production of an improved former or mould or moulding surface provided with a standard surface finish ranging from a smooth matt to a coarse granular texture as desired for the production of the aforesaid articles of or containing organic materials.

Still another object is to provide formers, molds or molding surfaces in for instance, clay, plaster of Paris or metal when reproduced from the aforesaid improved former or mold or molding surface.

According to the present invention the method for the provision of articles of or containing organic materials provided with a standard surface finish ranging from a smooth matt to a coarse granular texture as desired, comprises applying as a coating to formers, molds or molding surfaces, the particular type of granular precipitate desired obtained from aqueous dispersions of the kinds hereinafter specified, drying the aforesaid coatings thereon and thereafter contacting the thus produced matter former, mold or molding surface or replicas thereof produced according to known methods with aqueous emulsions or dispersions or solutions in organic solvents of organic materials of the kinds hereinafter specified by any one or more of such operations as dipping, spreading, spraying, molding or electrophoresis.

The method for the production of the improved former or mold or molding surface provided with a standard surface finish ranging from a smooth matt to a coarse granular texture as desired for the production of the aforesaid articles of or containing organic materials comprises applying as a coating to formers, molds or molding surfaces the particular type of granular precipitate desired obtained from aqueous dispersions of the kinds hereinafter specified and drying the aforesaid coatings thereon.

The aforesaid improved former or mold or molding surface can be used for the production of for instance, clay or plaster of Paris or metallic reproductions.

In the production of rubber articles having for instance wrinkled or corrugated effects, produced by inducing movement in applied fluid layers of organic materials relative to formers, molds or backing surfaces so as to form localized irregularities in the applied surface layers which are then rendered permanent by solidification, direct from aqueous dispersions or solutions in organic solvents, difficulty is experienced in producing a number of such articles having an approved standard uniformity and intensity of wrinkling or corrugation. It is therefore desirable in such cases to produce a former having a coating of the approved uniformity and intensity of wrinkling and corrugation which can be used as a master pattern for the production of for instance, clay or plaster of Paris or metallic reproductions. These reproductions may then be used directly for the production of articles of or containing organic materials directly from aqueous dispersions or solutions thereof.

Working with granular precipitates according to the present invention little difficulty is experienced in obtaining a number of articles with the particular form of surface finish ranging from a smooth matt to a coarse granular texture as desired when once the required granular precipitate has been obtained giving the particular surface finish. On the other hand it is often inconvenient to have to reproduce any particular granular precipitate. Furthermore articles with the desired surface finish according to the present invention can be produced for instance, by dipping, spraying or electrophoretic operations directly from aqueous emulsions or dispersions or solutions of rubber or the like without having to prepare the particular granular precipitate otherwise necessary.

The granular precipitates of compounded homogeneous finely divided compositions of rubber or similar material can be obtained for example by effecting coagulation of the aqueous dispersions aforesaid during stirring or agitation thereof, by precipitation in situ of one or more compounding ingredients by the interaction or double decomposition of one or more water-soluble reagents having normally no coagulating effect upon the aforesaid dispersions with one or more water-soluble reagents, an ion of which may incidentally possess coagulating influences, subsequently added thereto, whereupon the aforesaid dispersions are transformed into granular dispersions comprising comparatively large aggregates of/or containing rubber or the like particles distributed homogeneously throughout the aqueous medium as a precipitate of controlled degree of fineness.

Examples of the water-soluble reagents of the first class having normally no coagulating effect upon the dispersions are carbonates, sulphates or silicates of the alkali metals or of ammonium.

Examples of the water-soluble reagents of the second class which interact with the water-soluble reagents of the first class to produce insoluble compounding ingredients are soluble salts of magnesium, aluminum, calcium, barium or zinc; sodium silicate also falls into this class if the corresponding reagent in the first class is such as to precipitate silicic acid, for example, ammonium carbonate.

By suitable choice of the reagents and consequent reaction products dispersions of varying consistency can be formed which contain the precipitate in a finely divided condition inside the particles of the compounded coagulum of which the granular dispersion is constituted, thereby permitting a surface finish to be obtained ranging from a smooth matt to a coarse granular texture as desired.

If desired the granular precipitates are washed free from soluble reaction products such as soluble sulphate or chloride by known means such as decantation or filtration prior to their application as a coating material.

Numerous substances are capable of being used as compounding ingredients, for example, the carbonates of magnesium, calcium and zinc may be prepared from sodium carbonate and the sulphates or chlorides of these metals. Similarly the silicates of magnesium, barium and zinc can be prepared from sodium silicate and the corresponding sulphates or chlorides.

Further mixtures of precipitates may be prepared and may be chosen in such a manner that only one soluble reaction product results for two insoluble products, for example, the reaction between one equivalent of sodium carbonate with one of magnesium sulphate followed by one equivalent of barium chloride yields only one equivalent of sodium chloride for two equivalents of mixed precipitate. In this manner a large yield of precipitate may be obtained for a small proportion of soluble salt to be removed.

The reagents may be added in the form of their aqueous solutions and may contain protective colloids such as glue, gum acacia, in solution, to increase the fineness of sub-division of the precipitated compounding ingredients.

The concentration of the reacting solutions may also be selected for the same purpose.

The rate at which coagulation takes place after the introduction of the water-soluble reagent of the second class may be controlled by the addition of suitable substances, e. g. soaps such as ammonium oleate or stearate.

Flocculent or granular precipitates produced in other ways can also be employed in accordance with the present invention.

It has been known for some time that instead of the usual coherent type of coagulum it is possible to obtain rubber as a flocculent precipitate from latex by the use of certain coagulants and by adjustment of the concentration of the latex; see for instance, "Estate Rubber" O. deVries, p. 143, 1920.

The aforesaid flocculent or granular precipitates can be prepared from rubber latex in controllable manner by the use of a variety of coagulating agents and methods of coagulation provided that the coagulation is effected in the presence of a relatively large proportion of water and with or without the presence of a certain minimum amount of colloidal substance found to have a restraining effect upon the coagulation.

Examples of suitable coagulants are acetic acid, sodium silicofluoride, aluminum chloride, potash alum, barium chloride, zinc acetate, zinc sulphate, magnesium acetate, magnesium sulphate, ferrous sulphate, ferric sulphate, nitric acid, hydrochloric acid and sulphuric acid.

Examples of substances having a restraining effect on the coagulation are casein, glue and gum acacia, sodium aluminate. The amount of such substances used also influences the degree of sub-division of the granular dispersion. The degree of concentration has also an influence on the fineness of the precipitate. In general the lower the concentration the finer the precipitate.

The aqueous dispersions aforesaid are preferably employed at such dilutions that 100 ccs. thereof contain not more than 10% of total solids.

By the suitable choice of reagents and conditions of working granular dispersions of varying consistency can be formed.

If desired the granular precipitates can be washed free from soluble reaction products such as soluble sulphates or chlorides by known means as for instance by filtration and washing prior to their consolidation.

The dispersions comprise those consisting of or containing rubber, gutta-percha, balata or similar vegetable resins, occurring naturally or artificially obtained and in vulcanized or unvulcanized condition.

Aqueous dispersions of artificial rubber, coagulated rubber, vulcanized rubber, waste or reclaim, may also be employed if desired as alternatives or admixtures.

Any of the aforesaid dispersions may contain the usual known compounding ingredients and/or may be in concentrated form.

Concentrates such as are obtained in Patent No. 1,846,164, in which may be incorporated any one or more of the usual compounding ingredients may also be used.

It has been found according to the present invention that applying for example by spreading, dipping or spraying a final coating of granular precipitate produced by any one or more of the aforesaid manners gives a standard former or mold or surface which can be used to produce articles having an attractive matt or slightly rough finish particularly for certain types of surgeons' gloves.

The use of standard formers or molds or surfaces or replicas thereof according to the present invention leads to the production of articles having a more or less smooth outer surface, but with an inner surface bearing the desired markings. The articles are subsequently stripped from the aforesaid formers or molds. If desired the articles are reversed so that the outer surfaces show the desired markings. The articles are preferably vulcanized on the master former, mold or molding surface or replicas thereof produced according to known methods before removal.

The use of the standard formers or molds or replicas thereof according to the present invention permits articles of identical distribution and degree of marking to be produced direct from aqueous emulsions or dispersions or solutions of the kinds hereinbefore specified without it being necessary to have to prepare any of the special granular precipitates hereinbefore mentioned at the time when the standard degree of surface finish is required to be given to the article to be produced.

In such cases where it is desired to produce articles of or containing organic materials of the kinds hereinbefore specified having surfaces of a standard degree of wrinkling, corrugation or grain in addition to the surface finish ranging from a smooth matt to a coarse granular texture as desired the method for the provision of such articles comprises first providing a former, mold or backing surface with the wrinkled, corrugated or grained effects and thereafter applying as a coating the granular precipitates obtained from the aqueous dispersions of the kinds hereinbefore specified.

The aforesaid wrinkled, corrugated or grained effects can be first produced by coating the formers, molds or backing surfaces with aqueous dispersions of organic materials of the kinds hereinbefore specified or solutions thereof in organic solvents, inducing such movement of the applied fluid layers relative to the formers, molds or backing surfaces so as to form localized irregularities in the applied surface layers and then rendering permanent the uniform irregularly shaped pattern, marking or ornamentation so produced by subsequent or concurrent solidification. The final surface finish is then imparted as hereinbefore described.

What we claim is:

1. A method for the provision of articles of or containing organic materials provided with a predetermined surface finish which comprises applying to a forming surface a granular precipitate of dispersed material from an aqueous dispersion thereof, drying the aforesaid coating thereon and thereafter contacting the thus produced master surface with aqueous dispersions of organic materials.

2. A method as claimed in claim 1 wherein the granular precipitates are applied by spreading.

3. A method as claimed in claim 1 wherein the granular precipitates are applied by dipping.

4. A method as claimed in claim 1 wherein the granular precipitates are applied by spraying.

5. A method for the provision of articles of or containing organic materials according to the method claimed in claim 1 wherein in addition to the predetermined surface finish the aforesaid articles are provided with surfaces of a standard degree of wrinkling, corrugation or grain which comprises first providing a former, mold or backing surface with the wrinkled, corrugated or grained effects and thereafter applying as a coating the granular precipitates obtained from the aqueous dispersions of the kinds hereinbefore specified.

6. A method as claimed in claim 1 wherein the articles of or containing the organic materials produced are vulcanized on the master surface before removal.

7. The method of providing a mold surface of predetermined texture which comprises diluting rubber latex to a predetermined dilution, adding a coagulant while stirring to form a precipitate of dispersed materials of predetermined size, applying said precipitate as a surface coating to the mold surface and vulcanizing said coating thereon.

8. A method of forming a series of mold surfaces of identical texture which comprises compounding and diluting a latex to a predetermined dilution, precipitating the dispersed materials from said solution to form a precipitate of predetermined size, applying said precipitate as a surface coating to a master surface, fixing said coating thereon and thereafter forming a series of mold surfaces against said master surface.

9. A method of forming a series of mold surfaces of predetermined configuration and surface texture which comprises coating a surface with aqueous dispersions of organic materials, removing the surface of said fluid layers to form localized irregularities, permanently fixing said irregularities, precipitating dispersed materials from an aqueous dispersion thereof to a precipitate of predetermined fineness and superficially coating the irregular surface with the granular precipitate.

10. A method of forming a series of mold surfaces of predetermined configuration and surface texture which comprises coating a surface with aqueous dispersions of organic materials, removing the surface of said fluid layers to form localized irregularities, permanently fixing said irregularities, precipitating dispersed materials from an aqueous dispersion thereof to a precipitate of predetermined fineness and superficially coating the irregular surface with the granular precipitate and thereafter forming a succession of mold surfaces against said permanently fixed granular coated surface.

DOUGLAS FRANK TWISS.
EDWARD ARTHUR MURPHY.